(12) United States Patent
Hashiba

(10) Patent No.: US 9,452,307 B2
(45) Date of Patent: Sep. 27, 2016

(54) DECONTAMINATION METHOD FOR ORGANIC COMPOUND

(71) Applicants: Lunaere Inc., Tokyo (JP); Tomohiko Hashiba, Tokyo (JP)

(72) Inventor: Tomohiko Hashiba, Tokyo (JP)

(73) Assignees: LUNAERE INC., Tokyo (JP); Tomohiko Hashiba, Tokyo (JP)

( * ) Notice: Subject to any disclaimer, the term of this patent is extended or adjusted under 35 U.S.C. 154(b) by 0 days.

(21) Appl. No.: 14/487,926

(22) Filed: Sep. 16, 2014

(65) Prior Publication Data

US 2015/0005566 A1 Jan. 1, 2015

Related U.S. Application Data

(63) Continuation of application No. PCT/JP2013/057452, filed on Mar. 15, 2013.

(30) Foreign Application Priority Data

Mar. 16, 2012 (JP) .................................. 2012-060394

(51) Int. Cl.
*A62D 3/37* (2007.01)
*A62D 3/38* (2007.01)
(Continued)

(52) U.S. Cl.
CPC . *A62D 3/37* (2013.01); *A62D 3/38* (2013.01); *B01D 53/68* (2013.01); *B01D 53/72* (2013.01); *A62D 2101/02* (2013.01); *A62D 2101/04* (2013.01); *B01D 2251/10* (2013.01); *B01D 2253/102* (2013.01); *B01D 2253/106* (2013.01); *B01D 2253/108* (2013.01);
(Continued)

(58) Field of Classification Search
None
See application file for complete search history.

(56) References Cited

U.S. PATENT DOCUMENTS 4,345,104 A * 8/1982 Cropley ................. C07C 29/32
568/852
5,236,672 A 8/1993 Nunez et al.
(Continued)

FOREIGN PATENT DOCUMENTS

CN 101838075 A 9/2010
CN 101891200 A 11/2010
(Continued)

OTHER PUBLICATIONS

PCT International Search Report dated Jun. 11, 2013 issued in connection with PCT International Aalication No. PCT/JP2013/057452 with English Translation (4 pages).
(Continued)

*Primary Examiner* — Melvin C Mayes
*Assistant Examiner* — Sheng H Davis
(74) *Attorney, Agent, or Firm* — Robert P. Michal, Esq.; Carter, DeLuca, Farrell & Schmidt, LLP

(57) ABSTRACT

A method for efficiently and simply achieving decontamination of organic compounds, in particular, gaseous organic compounds diffused in the atmosphere, is provided by carrying out an in-situ treatment under in-situ environmental conditions. The method involves exposing organic compounds to a processing gas at normal temperature, thereby achieving decontamination, in which the processing gas includes a hydroxylmethyl radical, a hydroperoxy radical, a hydrogen radical, and a hydroxyl radical which are generated by allowing a catalyst to act on methanol gas.

5 Claims, 4 Drawing Sheets

(51) Int. Cl.
  *B01D 53/68*  (2006.01)
  *B01D 53/72*  (2006.01)
  *A62D 101/02*  (2007.01)
  *A62D 101/04*  (2007.01)

(52) U.S. Cl.
  CPC .. *B01D 2257/2064* (2013.01); *B01D 2257/55* (2013.01); *B01D 2259/4583* (2013.01)

(56) References Cited

U.S. PATENT DOCUMENTS

| | | | | |
|---|---|---|---|---|
| 5,332,563 | A | * | 7/1994 | Chang .................. B01D 53/60 210/760 |
| 2009/0112044 | A1 | | 4/2009 | Jain et al. |
| 2009/0263501 | A1 | | 10/2009 | McVey et al. |
| 2010/0270240 | A1 | * | 10/2010 | Hebert ................ B01F 5/0473 210/668 |
| 2011/0189058 | A1 | * | 8/2011 | Kawamata ............... A61L 2/20 422/211 |

FOREIGN PATENT DOCUMENTS

| | | | |
|---|---|---|---|
| EP | 1785149 | A1 | 5/2007 |
| JP | 11-033569 | A | 2/1999 |
| JP | 2001259073 | A | 9/2001 |
| JP | 2003220375 | A | 8/2003 |
| JP | 2003310792 | A | 11/2003 |
| JP | 2004261631 | A | 9/2004 |
| JP | 2005111002 | A | 4/2005 |
| JP | 2005199236 | A | 7/2005 |
| JP | 2006167359 | A | 6/2006 |
| JP | 4292234 | B1 | 7/2009 |
| JP | 2009255078 | A | 11/2009 |
| JP | 2011033569 | A | 2/2011 |
| JP | 2011041483 | A | 3/2011 |
| JP | 2011078902 | A | 4/2011 |
| JP | 2012024385 | A | 2/2012 |

OTHER PUBLICATIONS

PCT International Search Report dated Jun. 11, 2013 issued in connection with PCT International Application No. PCT/JP2013/057452 with English Translation (4 pages).

Search Report issued by the Chinese State Intellectual Property Office (SIPO) dated Mar. 28, 2016 in relation to Chinese Application No. 201380024548.3 (8 pages) along with English translation.

Extended European Search Report from European Appl. No. EP 13761084.6 dated Oct. 7, 2015 (5 pages).

* cited by examiner

DECONTAMINATION METHOD FOR ORGANIC COMPOUND

CROSS REFERENCE TO RELATED APPLICATIONS

This application is a continuation of PCT/JP2013/057452 filed Mar. 15, 2013, which claims the benefit of Japanese Patent Application No. 2012-060394, filed Mar. 16, 2012, the entire content of each of which is incorporated herein by reference.

TECHNICAL FIELD

The present invention relates to a method for decontaminating organic compounds, and in particular, toxic compounds such as chemical weapons.

BACKGROUND ART

There are some organic compounds released from a specific source, which exert influence on human bodies in terms of general toxicity, carcinogenicity, and the like. In particular, toxic compounds used as chemical weapons are considerably detrimental with respect to human bodies. The environmental restoration from contamination by such toxic compounds becomes problematic. Conventionally, there have been the following methods for decontaminating such toxic compounds: a method in which a mixed gas of ozone and hydrogen peroxide is used (Patent Document 1); a method in which toxic compounds are decomposed by combustion and acidic poisonous gas generated is neutralized with an aqueous solution of sodium hydroxide (Patent Document 2); a method in which toxic compounds are subjected to aqueous solution of sodium hydroxide (Patent Document 2); a method in which toxic compounds are subjected to evaporative removal by heating in a heating furnace under an airtight condition (Patent Document 3); and a method in which toxic compounds are decomposed by releasing a decontamination reagent which contains a photocatalyst, and then irradiating light including ultraviolet rays (Patent Document 4).

However, the method of using ozone described in the cited Patent Document 1 has a problem in that since ozone is corrosive, a treatment apparatus considerably deteriorates and the maintenance thereof is complicated. In addition, Patent Documents 2 and 3 require a large-scale apparatus, which has a heating furnace for burning toxic compounds. Furthermore, the decomposed products obtained after burning toxic compounds are also harmful, and therefore a neutralizing step therefor is required. For this reason, the operation is complicated. On the other hand, Patent Document 4 provides a method of releasing a decontaminating reagent, which is simple, but has a problem in that the toxic compounds do not decompose without irradiating light containing ultraviolet rays, and the decomposition cannot occur in a dark place.

PRIOR ART DOCUMENTS

Patent Documents

Patent Document 1: Japanese Unexamined Patent Application, First Publication No. 2012-024385
Patent Document 2: Japanese Unexamined Patent Application, First Publication No. 2003-310792
Patent Document 3: Japanese Unexamined Patent Application, First Publication No. 2005-199236
Patent Document 4: Japanese Unexamined Patent Application, First Publication No. 2011-078902

DISCLOSURE OF INVENTION

Technical Problems

The present invention was made in view of the circumstances of the prior art mentioned above. The present invention has an object to provide a method for efficiently and simply decontaminating organic compounds, and in particular, a method for efficiently and simply decontaminating organic compounds in the form of gas diffused in the atmosphere by carrying out an in-situ treatment under an in-situ environmental condition at which the gaseous organic compounds mentioned above diffuse.

Technical Solution

In order to achieve the aforementioned objective, the invention recited in Claim 1 relates to a method for decontaminating organic compounds, characterized by exposing the organic compounds to a processing gas at normal temperature, wherein the aforementioned processing gas includes a hydroxylmethyl radical, a hydroperoxy radical, a hydrogen radical, and a hydroxyl radical which are generated by allowing a catalyst to act on methanol gas.

In accordance with the method mentioned above, a processing gas can be exposed to an object to be treated in-situ, under an in-situ natural environmental condition where the object to be treated exists. That is, organic compounds released from a specific generation source can be decontaminated on site, of which the organic compounds are released under the environmental conditions. For this reason, the treatment steps can be greatly simplified, as compared with conventional methods using a heating furnace or a photolysis catalyst, and effective decontamination of organic compounds can be carried out. In addition, a hydroxylmethyl radical, a hydroperoxy radical, a hydrogen radical, and a hydroxyl radical which are generated by allowing a catalyst to act on methanol gas, do not have a corrosive property or a residual property. For this reason, deterioration of a decontamination apparatus can be reduced, and maintenance of the apparatus can be easily carried out. In addition, the processing gas containing the aforementioned radicals has reduced toxicity, as compared with ozone. For this reason, worker safety can be increased.

In addition, the processing gas may be exposed to the organic compounds, and for this reason, decontamination can be carried out regardless of which organic compounds are in the form of gas or in the form of liquid. In addition, when organic compounds are decontaminated, it is not necessary to carry out light irradiation to the organic compounds or adjust the temperatures of the decontamination environments. Therefore, decontamination of organic compounds can be instantaneously carried out under all natural environmental conditions.

In addition, since two or more radicals are contained in the processing gas, various organic compounds can be decomposed. In addition, it is possible to decompose the molecule forming the compound at two or more positions.

The invention according to Claim 2 is characterized in that the aforementioned organic compounds are gas, which diffuses in the atmosphere.

In the modes mentioned above, decontamination of an organic compound gas can be carried out by directly releasing a processing gas in the atmosphere, which is contaminated by the organic compound gas. Therefore, even if an organic compound with high volatility diffuses in the atmosphere, an instant decontamination treatment can be carried out. In addition, a hydroxylmethyl radical, a hydroperoxy radical, a hydrogen radical, and a hydroxyl radical which are generated by allowing a catalyst to act on methanol gas, do not have a corrosive property or a residual property. For this reason, deterioration of structures present around the decontamination treatment can be prevented even if the processing gas is directly released in the atmosphere. The aforementioned processing gas has a reduced influence on a human body or a living system. Therefore, even if the processing gas is directly released in the atmosphere, environmental burden will be reduced.

The invention according to Claim 3 is characterized in that decontamination is carried out by causing the aforementioned organic compounds to be adsorbed by a porous body.

In the modes mentioned above, since organic compounds are adsorbed by a porous body, the reliability of decontamination can be substantially improved.

The invention according to Claim 4 is characterized in that the aforementioned organic compounds are an organic phosphorus compound or a chlorine-based compound, Advantageous Effects of the Invention According to the method for decontaminating organic compounds of the present invention, gaseous organic compounds diffused in the atmosphere can be efficiently and simply decontaminated by carrying out an in-situ treatment under the environmental conditions of the place at which the aforementioned gaseous organic compounds diffuse.

MODES FOR CARRYING OUT THE INVENTION

The decontamination method according to the present invention corresponds to a method for carrying out decontamination by exposing organic compounds to a processing gas at normal temperature. Decontamination means chemically or physically decomposing or removing the causative substances of contamination.

In the present invention, as a processing gas, a gas containing radical species generated by making a catalyst act on a methanol gas is used. The radical species produced by the reaction include a hydroxylmethyl radical, a hydroperoxy radical, a hydrogen radical, and a hydroxyl radical. It is considered that these radical species exhibit an ability to decompose organic compounds. The processing gas may include the active species of the methanol source, which are not radical species, for example, formaldehyde.

A method for exposing a processing gas corresponds to, for example, a method of releasing a processing gas to a predetermined zone at normal temperature. Normal temperature is room temperature in indoor cases and ambient temperature in outdoor cases and means the natural environmental temperature in which the temperature of the processing environmental condition is not artificially adjusted.

The organic compounds to be decontaminated may be liquid organic compounds or gaseous organic compounds. They may be organic compounds with high volatility, which diffuse in the atmosphere. The decontamination method according to the present invention is effective in decontamination of an organic phosphorus compound or chlorine-based compound. Examples of organic phosphorus compounds are a V-agent (VE gas, VG gas, VM gas, or VX gas) and a G-agent (tabun, sarin, soman, ethylsarin, or cyclosarin). Examples of chlorine-based compounds are lewisite, mustard gas, and ethyldichloroarsine.

Organic compounds may be decontaminated by causing them to be adsorbed by a porous body. The porous body means a porous material having a physical-adsorption ability, examples of which include, for example, activated carbon, zeolite, mesoporous silica, and the like. In this method, after organic compounds are adsorbed by a porous body to fix thereto, a processing gas is exposed to the porous body to decontaminate the organic compounds.

Hereinafter, embodiments of a preferable apparatus for carrying out the decontamination method according to the modes of carrying out the present invention are described in detail, with reference to the drawings.

First Embodiment

Figure 1:
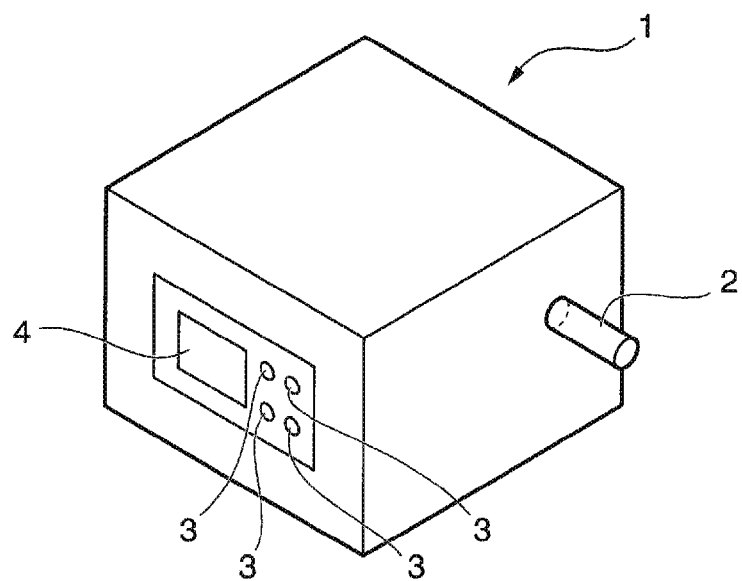
FIG. 1 is a perspective view showing a first embodiment of an apparatus for generating a processing gas used in the decontamination method according to the present invention.

In an apparatus 1 for generating a processing gas according to the first embodiment used in the present invention, as shown in FIG. 1, a feeding tube 2 for a processing gas is provided at the lateral face part of the apparatus. Various operators 3 for setting up a concentration of a processing gas, a temperature thereof, a processing period, a processing gas flow rate, and the like, and a state indicator 4 are provided at the front face part of the apparatus.

Figure 2:
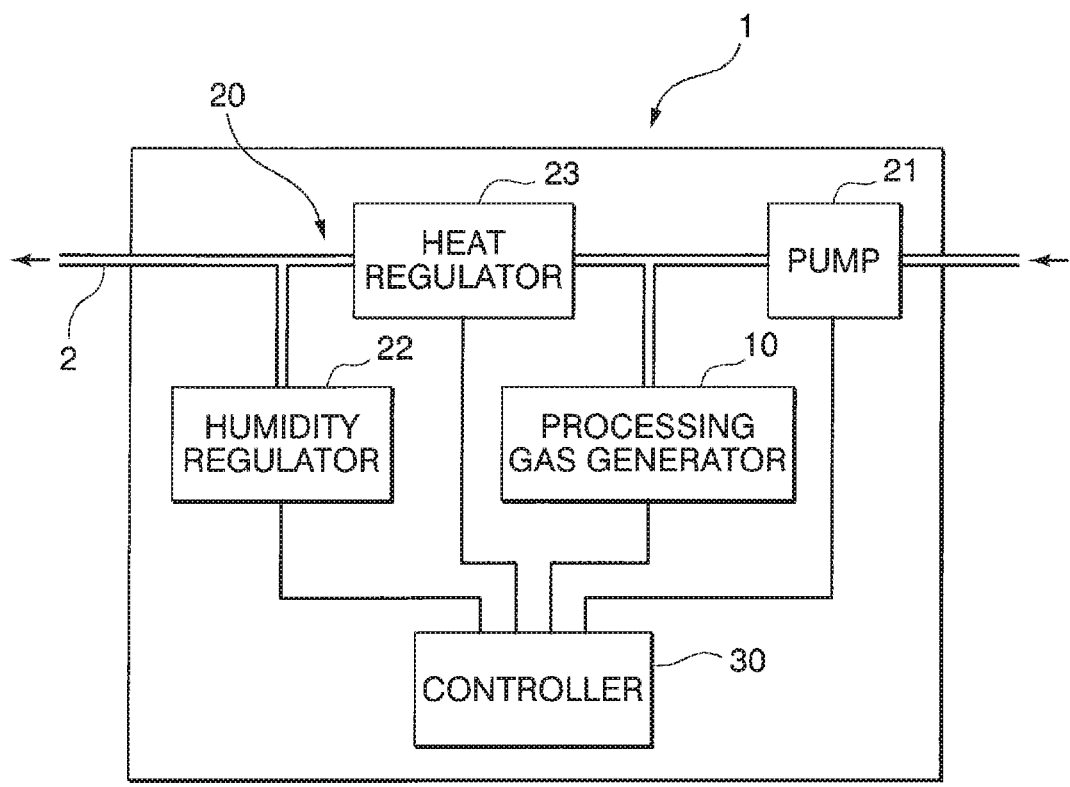
FIG. 2 is a configuration diagram of the apparatus for generating a processing gas according to the first embodiment.

In the apparatus 1 for generating a processing gas according to the first embodiment, as shown in FIG. 2, a processing gas generator 10, a gas conveyance system 20 which supplies the processing gas generated by this processing gas generator 10 to an objective zone to be treated, and a controller 30 are provided. The controller 30 is provided with a function of controlling the operation of the processing gas generator 10 and the gas conveyance system 20.

Figure 3:
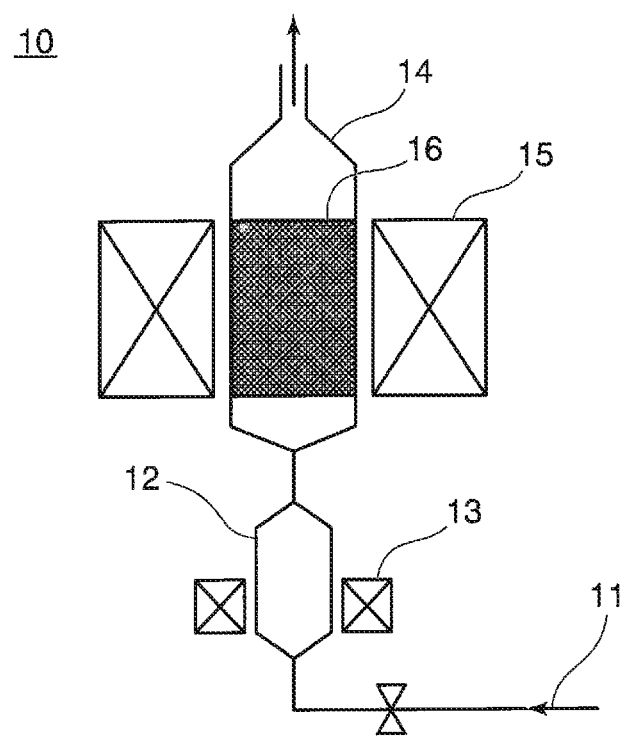
FIG. 3 is a configuration diagram of the processing gas generator according to the first embodiment.

The aforementioned processing gas generator 10 is provided with a vaporizing chamber 12 to which methanol is supplied through a conveyance tube 11 from the source of a methanol supply (not shown) as shown in FIG. 3, a first heat regulator 13 which heats the vaporizing chamber 12 from the periphery, a substantially cylindrical catalyst vessel 14 connected to the upper part of the vaporizing chamber 12, and a second heat regulator 15 which heats the catalyst vessel 14 from the periphery. The catalyst vessel 14 is charged with granulated catalyst 16. Platinum, copper, aluminum, carbon, or a mixture thereof can be used for the catalyst 16.

When a processing gas is generated in the processing gas generator 10, methanol, in a specified quantity, is first supplied in the vaporizing chamber 12. The methanol supplied to the vaporizing chamber 12 is evaporated by heating, and is then supplied to the catalyst vessel 14. Within the catalyst vessel 14, a catalyst acts on a methanol gas, and thereby, a catalytic radical-formation reaction occurs. As a result, a processing gas including various radical species, such as a hydroxylmethyl radical, a hydroperoxy radical, a hydrogen radical, and a hydroxyl radical, is generated. The processing gas yield depends on the amount of evaporation of methanol in the vaporizing chamber 12, the amount of the methanol gas supplied to the catalyst vessel 14, the heating temperature of the catalyst vessel 14, and the like.

A gas conveyance system 20 has a suction pump 21 for conveyance of external air or a processing gas (a processing gas or a mixture of a processing gas and external air) to be discharged from the feeding tube 2 for a processing gas, a humidity regulator 22 which adjusts humidity of the processing gas to be discharged, and a heat regulator 23 which adjusts a temperature of the processing gas to be discharged. The suction pump 21, the humidity regulator 22, and the heat regulator 23 are controlled by a controller 30.

The controller 30 controls the humidity and temperature of the processing gas to be discharged in the predetermined range by controlling the humidity regulator 22 and the heat regulator 23, while controlling the concentration of the processing gas to be discharged by controlling the processing gas generator 10 in the predetermined range.

Second Embodiment

Figure 4:
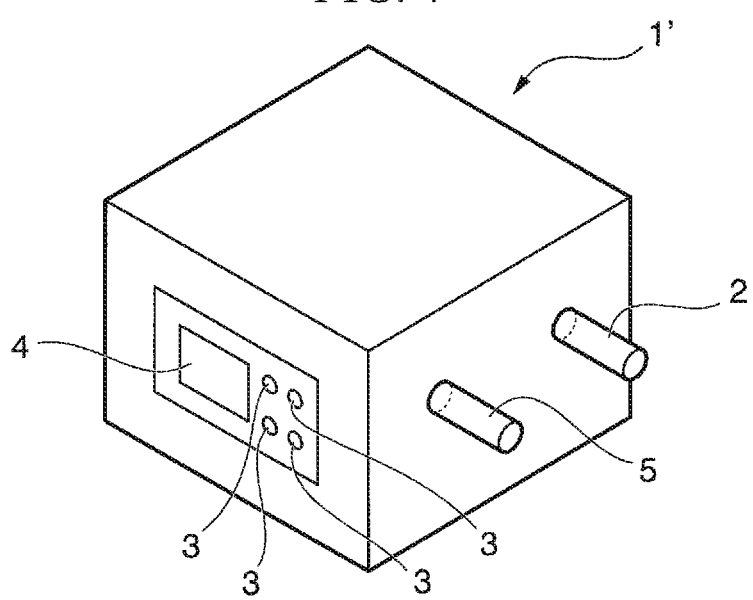
FIG. 4 is a perspective view of an outer appearance showing a second embodiment of an apparatus for generating a processing gas used in the decontamination method according to the present invention.

In the present invention, the aforementioned apparatus 1 for generating a processing gas may be replaced with another apparatus 1' for generating a processing gas, which is provided with a gas emission system 40 which discharges exhaust gas after the organic compounds are subjected to a decomposition treatment at an objective zone to be treated. The outer appearance of the apparatus 1' for generating a processing gas according to the second embodiment is shown in FIG. 4. A feeding tube 2 for a processing gas and an exhaust gas-discharging tube 5 are provided at the side part of the apparatus. Various operators 3 for setting a concentration of a processing gas, a temperature thereof, a processing period, a processing gas flow rate, and the like, and a state indicator 4 are provided at the front part of the apparatus. The apparatus 1' for generating a processing gas is effective when an objective zone to be treated is a closed space. The same symbols are given to the same elements as shown in the apparatus 1 for generating a processing gas according to the first embodiment.

Figure 5:
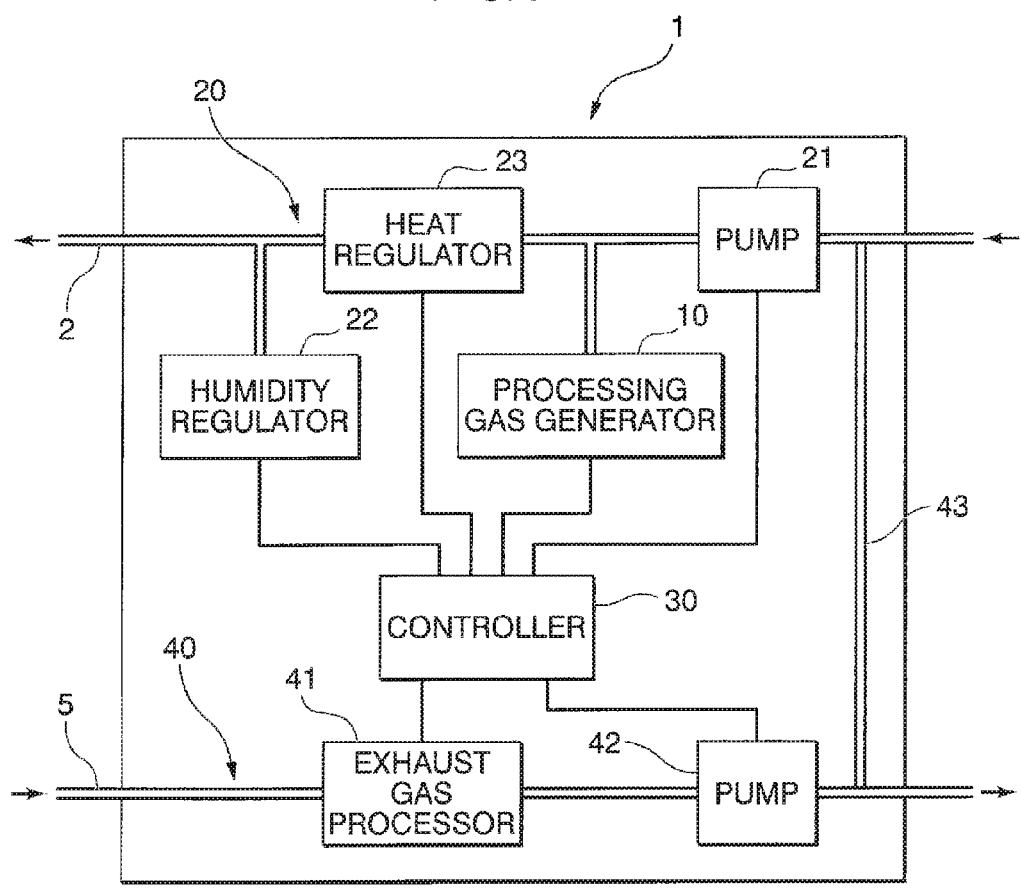
FIG. 5 is a configuration diagram of the apparatus for generating a processing gas according to the second embodiment.

The apparatus 1' for generating a processing gas is provided with, as shown in FIG. 5, a processing gas generator 10, a gas conveyance system 20 which supplies the processing gas generated by this processing gas generator 10 to an objective zone to be treated, a controller 30, and a gas emission system 40. The gas emission system 40 is provided with an exhaust gas treater 41, a gas displacement pump 42, and a flowing-back air passage 43, which are provided inside the apparatus for generating a processing gas generator.

When the gas displacement pump 42 is driven, the exhaust gas obtained after the decomposition treatment is suctioned from an objective zone to be treated via the exhaust gas-discharging tube 5, is subjected to an inactivation treatment by means of the exhaust gas treater 41, and is then discharged from the discharge side of the gas displacement pump 42. The exhaust gas obtained after the inactivation treatment, which is discharged from the gas displacement pump 42, is released to the outside of the apparatus 1' for generating a processing gas, or alternatively is supplied to the suction pump 21 via the flowing-back air passage 43 which connects the inlet-port side of the suction pump 21 and the discharge-port side of the gas displacement pump 42.

The exhaust gas treater 41 and the gas displacement pump 42 are controlled by the controller 30 in the same manner as that of the processing gas generator 10, the suction pump 21, the humidity regulator 22, and the heat regulator 23.

The gas conveyance system 20 of the apparatuses 1, 1' for generating a processing gas according to the aforementioned first embodiment and second embodiment, is provided with the humidity regulator 22 and the heat regulator 23. However, in the case in which it is not necessary to control the temperature and humidity of the processing gas supplied to an objective zone to be treated in the predetermined range, the humidity regulator 22 and the heat regulator 23 may not be provided.

Next, a method for decontaminating organic compounds by means of the aforementioned apparatuses 1, 1' for generating a processing gas is described below. The operation, in the decontamination of organic compounds, of the apparatuses 1, 1' for generating a processing gas at an objective zone to be treated is carried out by the specialists for operation. Here, a method for decontaminating an organic compound gas released from a specific source in a closed space such as a factory and a disposal field, by means of an apparatus 1' for generating a processing gas according to the second embodiment is described with reference to FIG. 6.

Figure 6:
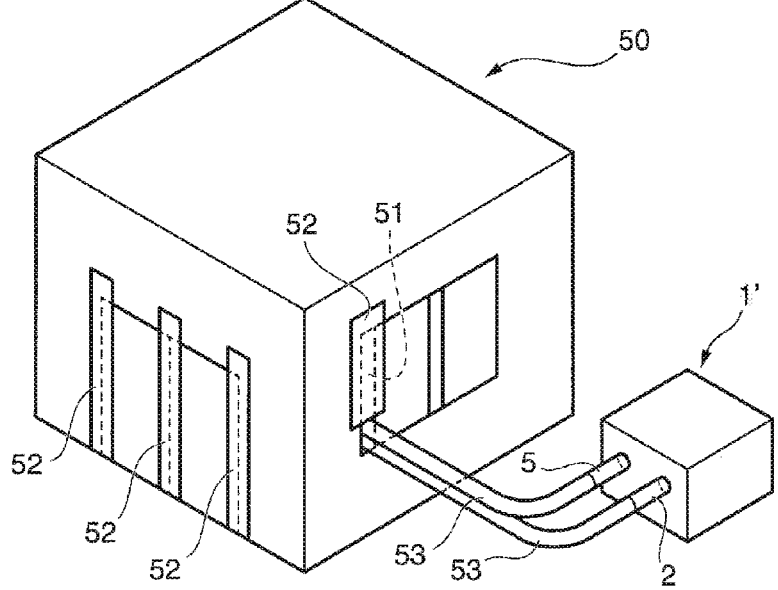
FIG. 6 is a configuration diagram showing a usage example of the present invention.
Figure 7:
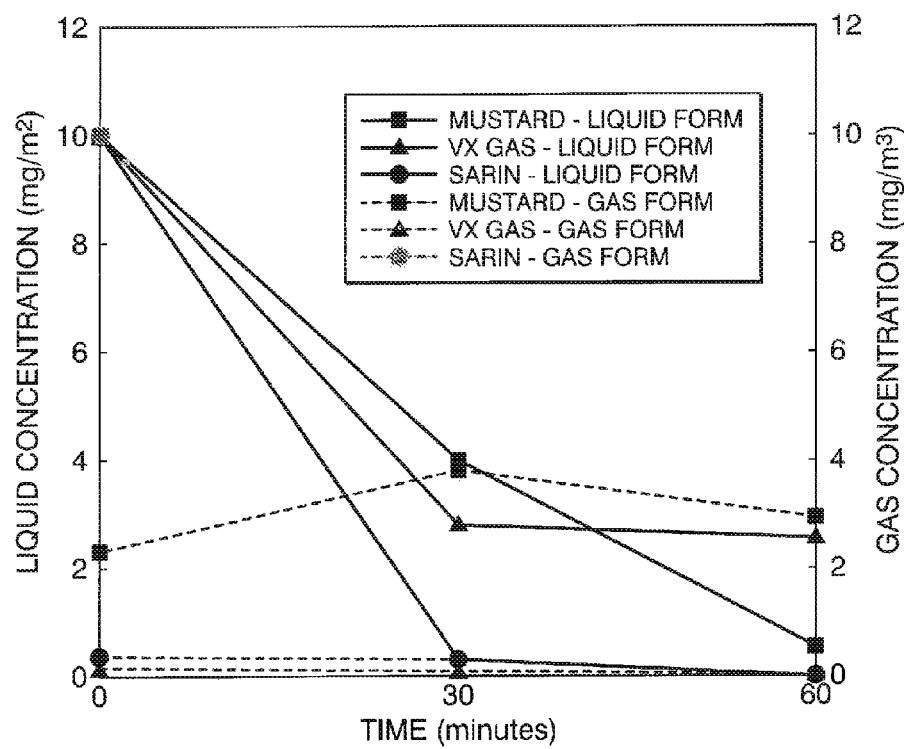
FIG. 7 is a figure showing the results of working examples of the present invention.

In the decontamination of an organic compound gas which is a contaminating material, first, an apparatus 1' for generating a processing gas is placed near a structure 50 having a source of releasing the organic compound gas. At this time, a chemical indicator for checking a state of decontamination due to the organic compound gas can suitably be arranged to the prescribed spot at the inner side of the structure 50 so that the whole internal area of the structure 50 may be covered as an objective zone to be treated. The setting position of the apparatus 1' for generating a processing gas is preferably set to the place where operators can easily observe the chemical indicator. Next, from suitable cavity parts 51 of the aforementioned structure 50, the tip of the processing gas-feeding tube 2 and the tip of the exhaust gas-discharging tube 5 are inserted into the inner part of the structure 50. If there is distance between the apparatus 1' for generating a processing gas and the cavity part 51 of the structure 50 and the tip of the processing gas-feeding tube 2 and the tip of the exhaust gas-discharging tube 5 do not reach the inner part of the structure 50, tubular members 53, such as a rubber tube or a metal tube, are suitably connected to the processing gas-feeding tube 2 and the exhaust gas-discharging tube 5, as shown in FIG. 6

Then, in order to improve the decontamination efficiency of organic compounds, the cavity part of the structure 50, containing cavity part 51 into which the processing gas-feeding tube 2 and the exhaust gas-discharging tube 5 are inserted is filled with a blockade member 52 such as a tape or a filler. In FIG. 6, the cavity part 51 and the cavity of the side exit are sealed up with tapes as the blockade member 52. In order to prevent the excessive increase of the atmospheric pressure of the inner part of the structure 50 caused by supplying a processing gas, a slight gap may remain without completely sealing an objective zone to be treated.

Next, an operation specialist drives the apparatus 1' for generating a processing gas on a mode of decomposition treatment of organic compounds by means of the operator 3. Namely, a processing gas is supplied to the inner part of the structure 50, which is an objective zone to be treated, and the organic compound gas is decontaminated at room temperature. At this time, the processing gas is supplied to an objective zone to be treated, in a specified concentration and at a specified flow rate by carrying out drive control of the suction pump 21 and the processing gas generator 10 by means of the controller 30, while stopping the gas displacement pump 42.

In decontamination of an organic compound gas, the humidity and temperature of the processing gas may be suitably adjusted under controlling with the controller 30 by means of the humidity regulator 22 and the heat regulator 23, if necessary. In addition, a heating apparatus may be placed in an objective zone to be treated and the temperature adjustment in the objective zone to be treated may be carried out. Then, a processing gas may be supplied and decontamination of the organic compound gas may be carried out.

After a specified amount of time, when the decomposition of the organic compound gas released in the inner part of the structure 50 and the stop of releasing the organic compounds from a release source are confirmed by means of a chemical indicator, the driving mode of the apparatus 1' for generating a processing gas is switched from the mode of decomposition treatment of organic compounds to the mode of discharge of exhaust gas by means of the operator 3. Thereby, discharge of exhaust gas is started. That is, the processing gas generator 10 is stopped, and the exhaust gas in an objective zone to be treated is discharged by carrying out the drive control of the suction pump 21 and the gas displacement pump 42 by means of the controller 30. The exhaust gas discharged from the structure 50, which is an objective zone to be treated, is treated with the exhaust gas treater 41, and the treated exhaust gas is introduced into a suction pump via the gas displacement pump 42, and is again supplied to the structure 50. As described above, the concentration of the processing gas in an objective zone to be treated can be reduced to a specified value by repeating the gas circulation steps in which the exhaust gas in an objective zone to be treated is treated in the exhaust gas treater 41 and then is again supplied to the objective zone to be treated for a specified period of time. The operation specialist confirms that the concentration of the processing gas is reduced to the predetermined value and then stops the driving mode of the exhaust gas-discharging mode of the apparatus 1' for generating a processing gas.

After a series of the aforementioned operations are completed, the operation specialist removes the processing gas-feeding tube 2 and the exhaust gas-discharging tube 5 from the structure 50 which was an objective zone to be treated, and removes the blockade member 52 with which the cavity of the structure 50 was filled.

In the aforementioned method for decontamination of organic compounds, the apparatus 1' for generating a processing gas according to the second embodiment is used for a closed space. The apparatus 1' may be replaced with the apparatus 1 for generating a processing gas according to the first embodiment. Namely, not only suction, but also discharge of the exhaust gas may be carried out by the suction pump 21 of the apparatus 1 for generating a processing gas under the control with a controller 30 so that the suction pump 21 can carry out both the supply of a processing gas to a closed space and the discharge of the exhaust gas (the discharge of the exhaust gas or the repetition of the discharge of the exhaust gas and the supply of the external air).

In addition, in the aforementioned method for decontamination of organic compounds, the source of releasing an organic compound gas exists in the closed space, and the organic compound gas is decontaminated in the aforementioned closed space using the apparatus 1' for generating a processing gas according to the second embodiment. In the case where a source of releasing an organic compound gas exists in open space such as the outdoors, the organic compound gas released in the open space may be decontaminated by means of the apparatus 1 for generating a processing gas according to the first embodiment instead of the apparatus 1' for generating a processing gas according to the second embodiment. Namely, an operation specialist appropriately arranges a chemical indicator at an objective zone to be treated where an organic compound gas is detected and supplies a processing gas by operating the apparatus 1 for generating a processing gas in the decomposition treatment mode for organic compounds until the chemical indicator is reduced to a prescribed value. When the organic compound gas is reduced to a predetermined value, the operator stops the driving of the apparatus 1 for generating a processing gas. At this time, the exhaust gas after decontamination of the organic compound gas is released in the atmosphere.

As mentioned above, when a method according to the present invention is used, a processing gas may be directly exposed to the released objective to be treated. For this reason, the treatment steps can be considerably simplified, as compared with a conventional method using ozone, a heating furnace, or a photolysis catalyst. In addition, the decontamination of the organic compounds can be instantaneously carried out under all natural environmental conditions.

In addition, in the method according to the present invention, as the processing gas, the hydroxylmethyl radical, the hydroperoxy radical, the hydrogen radical, and the hydroxyl radical generated by making a catalyst act on methanol gas are used. Such a processing gas does not have a corrosive property or a residual property, and for this reason, little deterioration of a decontamination apparatus is exhibited, and maintenance of the apparatus is easily carried out. In addition, due to the high degree of safety of a processing gas, decontamination can be carried out with respect to any subject, such as humans, equipment such as weapons and vehicles, area such as a road and the like, institutions such as buildings, subways and the like, precision equipment and the like.

In the aforementioned decontamination method, a processing gas is exposed when the organic compound gas diffuses in the atmosphere. On the other hand, after porous adsorbents such as activated carbon are arranged and the organic compound gas may be adsorbed by the porous adsorbents, the aforementioned porous adsorbents may be exposed to a processing gas to decontaminate the organic compound gas. In addition, in the aforementioned decontamination method, the organic compound gas is decontaminated. If liquid organic compounds are exposed to a processing gas, the liquid organic compounds can be decontaminated in the same manner as described in the organic compound gas.

Examples

Hereinafter, working examples of a decontamination method of the present invention are described. Herein, the cases in which the method was applied to the decontamination of sarin, mustard gas, and VX gas are illustrated.

Gas collection tube: TENAX capturing tube (manufactured by GL Sciences Inc.)

Apparatus for generating a processing gas: Methanol Radical Gas (MR) Generator (manufactured by Wingturf Co., Ltd.)

Exposure conditions: temperature of 20° C., and humidity of 90%

A gas sampling apparatus has a structure including a processing-objective gas system, which was formed from a rubber tube (inner diameter=3.0 mm), for passing a sarin-containing gas; an MR system formed from a rubber tube (inner diameter=3.0 mm), for introducing a methanol radical gas (MR) into the processing-objective gas system via a Y-shaped joint inserted into the aforementioned processing-objective gas system; a TENAX capturing tube provided at the end of the downstream side of the processing-objective gas system; and a suction pump provided at the downstream of the TENAX capturing tube. At this time, the length of the rubber tube (inner diameter 3.0 mm) between the Y-shaped joint and the TENAX capturing tubes was set to 30 cm.

An apparatus for generating a sarin gas was connected to the end of the upper stream of the rubber tube, which formed the processing-objective gas system. The apparatus for generating a sarin gas generated a sarin gas by bringing the air stream formed by driving the suction pump of the aforementioned gas sampling apparatus, into contact with liquid sarin. A processing gas-feeding tube of an MR generating apparatus was connected to the end of the upstream of the rubber tube forming the MR system.

The suction pump of the gas sampling apparatus was driven, and a sarin gas was flown to the processing-objective gas system so that the flow rate at the position of the upstream with respect to the position of a Y type joint was 1 L/min. In the MR system, a gas of MR 1000 ppm was flown at the flow rate of 5 L/min by driving the MR generating apparatus. MR, flowing through the MR system, was supplied to the processing-objective gas system, in which a sarin gas was flown via the Y-shaped joint. In addition, the gas obtained after MR was added was caught for 60 minutes in the TENAX capturing tube provided at the end of the downstream side of the processing-objective gas system. Same operation was also carried out with respect to a mustard gas and VX gas.

Next, the liquid concentration and the gas concentration of each of the samples were measured. The measurement results are shown in FIG. 7.

As shown in FIG. 7, it was confirmed that by supplying the MR gas, the liquid concentration of each of sarin, mustard gas, and VX gas decreased. In particular, sarin was substantially decomposed 30 minutes after the MR gas was supplied, and completely decomposed 60 minutes after the MR gas was supplied.

INDUSTRIAL APPLICABILITY

The method of the present invention can effectively decontaminate organic compounds in situ, under in-situ environmental conditions in which the organic compounds exist. For this reason, in particular, the method of the present invention can be efficiently utilized in the cleanup of the atmosphere in which gaseous organic compounds diffuse. In addition, the method of the present invention can be effectively utilized not only in the atmosphere, but also in cleanup of contaminated soil and contaminated water, since a processing gas may be directly exposed to the organic compounds, which are contaminated materials.

EXPLANATIONS OF SYMBOLS

1, 1' Apparatus for generating a processing gas
10 Processing gas generator
20 Gas conveyance system
30 Controller
40 Gas discharge system

The invention claimed is:

1. A decontamination method comprising exposing organic compounds selected from the group consisting of VE gas, VG gas, VM gas, sarin, ethylsarin, and cyclosarin to a processing gas, wherein said processing gas comprises a hydroxyl methyl radical, a hydroperoxy radical, and a hydrogen radical which are generated by allowing a catalyst to act on methanol gas, wherein the exposing to a processing gas is performed at a normal temperature.

2. The decontamination method according to claim 1, wherein said organic compounds selected from the group consisting of VE gas, VG gas, VM gas, VX gas, sarin, ethylsarin, and cyclosarin are a gas, which diffuses in the atmosphere.

3. The decontamination method according to claim 2, wherein said organic compounds selected from the group consisting of VE gas, VG gas, VM gas, VX gas, sarin, ethylsarin, and cyclosarin are decontaminated by causing said organic compounds to be adsorbed by a porous body.

4. The decontamination method according to claim 2, wherein said organic compounds selected from the group consisting of VE gas, VG gas, VM gas, VX gas, sarin, ethylsarin, and cyclosarin are exposed in the atmosphere to said processing gas.

5. The decontamination method according to claim 1, wherein said organic compounds selected from the group consisting of VE gas, VG gas, VM gas, VX gas, sarin, ethylsarin, and cyclosarin are decontaminated by causing said organic compounds to be adsorbed by a porous body.

* * * * *